3,225,023
PROCESS FOR CONTROLLING MELT INDEX
John Paul Hogan and Alonzo G. Kitchen, Bartlesville, Okla., assignors to Phillips Petroleum Company, a corporation of Delaware
Filed Nov. 30, 1962, Ser. No. 241,323
6 Claims. (Cl. 260—94.9)

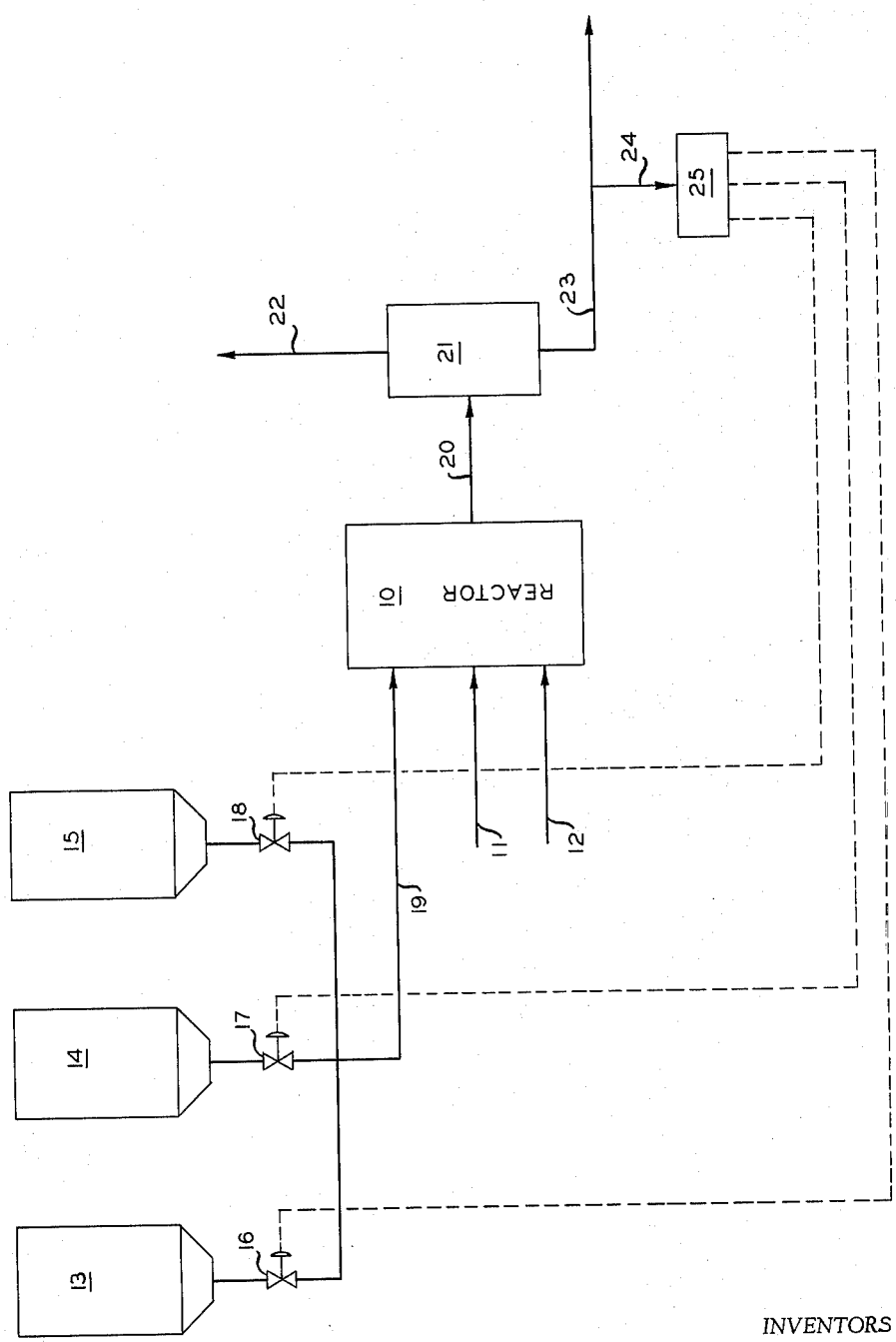

This invention relates to a method of controlling the melt index of polymers of 1-olefins. In one aspect it relates to a method of producing polymers of 1-olefins having a predetermined melt index. In another aspect it relates to a method for providing polymers of 1-olefins having a controlled molecular weight by controlling a physical characteristic of the catalyst.

One of the problems encountered in the development of a process for the formation of polymers of 1-olefins is that of controlling the molecular weight of the product. In the absence of any control, there is frequently produced a polymer of a molecular weight so high and a melt flow so low as to preclude the use of the polymer in many important applications. The melt flow of the polymer at a given melt temperature is believed to be determined by the molecular weight of the polymer, e.g., a polymer with a higher molecular weight being less fluid than one with a lower molecular weight. A standard measure of the melt flow of the polymer is the melt index test, described in detail in ASTM-D-1238-52T. This test is widely used to distinguish melt flow properties of 1-olefin polymers. Commercial solid polymers of 1-olefins in general fall within a melt index range of 0.2-3. Some of the methods which have been previously tried to control melt index within the desired range have limited the reaction conditions in a way which placed restriction on catalyst activity, solubility of the components in the reaction mixture, and the like.

We have now discovered that the melt index and thus the molecular weight of a 1-olefin polymer is responsive to the average pore diameter of the catalyst support. Thus by increasing the average pore diameter of the catalyst support there is achieved an increase in the melt index of the polymer prepared in the presence of a catalyst containing such support. By regulating the average pore diameter of the catalyst support, preferably between about 60 to 400 Angstrom units, we are now able to provide a polymer of 1-olefins which will have a predetermined and controlled melt index and thus a predetermined and controlled molecular weight.

Thus it is an object of this invention to provide a process for regulating the melt index of polymers of 1-olefins.

Another object of this invention is to provide a process for producing polymers of 1-olefins having a predetermined and regulated molecular weight.

Other aspects, objects and the several advantages of this invention will be readily apparent from a study of the disclosure, the drawing, and the appended claims.

According to this invention there is provided a process for regulating the melt index of a 1-olefin polymer by varying the average pore diameter of a catalytic support used in conjunction with a suitable catalytic component to initiate the polymerization of the 1-olefin. Suitable catalytic components include chromium oxide, nickel oxide, vanadium oxide, and molybdenum oxide; and suitable supports include silica, alumina, zirconia and thioria.

A presently preferred polymerization catalyst is a silica-supported chromium oxide catalyst containing from about 0.1 to about 20 and preferably from about 1 to about 5 weight percent chromium, at least a portion of which is in the hexavalent state. The preparation of this solid composite can be carried out essentially in the same manner as that described in U.S. Patent 2,825,721, i.e., a chromium oxide or compound convertible to chromium oxide on calcination is incorporated onto the desired support by such means as impregnation, followed by activation in air at elevated temperatures.

The process of this invention can be employed in the polymerization of various monomers, particularly $C_2$ to $C_8$ 1-olefins such as ethylene, propylene, 1-butene, 1-pentene, 4-methyl-1-pentene, 1-hexene, 1-heptene, 1-octene, and mixtures of two or more of these. It is also useful in polymerization of conjugated dienes such as butadiene, isoprene, and mixtures of 1-olefins and conjugated dienes. The method is particularly applicable to the polymerization of ethylene and mixtures of ethylene with other monomers wherein said other monomer is present in amounts generally less than 25 mol percent.

According to the process of the invention, the olefin charge and catalyst having a selected average pore diameter are contacted at a temperature of 150–450° F. and at a pressure of 0–2000 p.s.i.g. The reaction time will range from about 0.1 minute to about 10 hours, preferably 0.5 to 5 hours. The process may be carried out in the presence or absence of a diluent. However, a diluent generally is preferred and materials such as cyclohexane or isooctane frequently are used for this purpose in amounts of 0.5–100 parts of diluent per part of polymerizable monomer by weight. Any conventional polymerization technique such as a stirred batch reactor, a continuous fixed catalyst bed system, or a continuous suspended catalyst system can be used. Where a continuous process is being carried out, the average pore diameter can be varied during the course of operating the process to thereby produce polymer of varying melt index. In a fixed bed reactor, the liquid hourly space velocity of the feed will range from 0.1 to 600. In whichever technique is used, the rate of olefin addition will depend to a significant degree upon the initial amount of catalyst charged or upon the addition rate of catalyst if the system is continuous. The amount of catalyst used will depend upon the desired rate of polymer production and the capacity of the polymerization equipment, particularly in regard to its ability to conveniently dissipate the heat of reaction. In general, the catalyst in the reaction zone will be present in an amount from about 0.01 to 10.0 weight percent of the monomer present.

As shown in the accompanying figure, which is a schematic representation of the present invention, there is provided a reactor 10 so adapted as to allow introduction of various reactants to same. Conduit 11 communicating with reactor 10 is adapted to introduce the olefin feed to same. Conduit 12 is provided to introduce the desired solvent into the system. Hoppers 13, 14 and 15 are provided with suitable valve and control means 16, 17 and 18 in communication with conduit 19 so as to provide the requisite catalyst to the reaction system. The control means as illustrated are of such a nature that the average pore diameter of the catalyst support entering the reaction system can be controlled. Conduit 20 communicates with reactor 10, removes the effluent from same, and passes the effluent comprising monomer, polymer, catalyst and solvent to separator 21 wherein the catalyst is removed from the system. The catalyst thus removed can then be recycled to the hoppers or directly to the reactor by means of conduit 22. The effluent from the separator is removed by way of conduit 23 for subsequent recovery of the polymer having the desired melt index.

A sample of the polymer effluent is removed by conduit 24 to analyzer-controller 25 wherein the melt index of the polymer is determined. This value is compared with a pre-set point representative of the desired melt index. The resulting value is then converted to a pneumatic or electrical signal which then is applied to valves 16, 17 and 18 so as to regulate the average pore diameter of the catalyst support being employed in the reaction, and to thereby control and regulate the melt index of the polymer being formed. Thus by regulating the average pore diameter of the catalyst support there is achieved a resulting polymer having predetermined and regulated melt index.

The following example is presented to further illustrate this invention.

EXAMPLE

A commercial silica gel having an average pore diameter of 35 A. was impregnated with sufficient chromium trioxide to yield a 2.5% Cr containing composite after drying and activation in air for 5 hours at 1000° F. The activated catalyst was used in an ethylene polymerization run carried out in a stirred reactor of about 1-liter capacity using cyclohexane as a diluent. A one-hour run at 450 p.s.i.g. was carried out, after which the reactor was vented and the polymer was dried and recovered. The melt index of the polymer was found to be 0.31. Essentially identical runs where carried out with catalysts which varied only in the nature of their silica supports. The essential data of these runs are recorded in the following table.

*Table*

| Silica Sample | Ave. Pore Diam., A.[1] | Reaction Temp., ° F. | Yield, #/# | Melt Index [2] |
|---|---|---|---|---|
| 1 | 35 | 295 | 240 | 0.31 |
| 2 | 56 | 294 | 520 | 0.28 |
| 3 | 61 | 295 | 590 | 0.29 |
| 4 | 91 | 295 | 760 | 0.80 |
| 5 | 188 | 290 | 870 | 1.51 |
| 6 | 349 | 294 | 560 | 2.70 |

[1] The average pore diameter is determined in this manner: (a) The surface area is determined by the standard BET method. (b) The pore volume is determined by the method of Innes, Analytical Chemistry 28, 332 (1956). (c) The average pore diameter is calculated—

$$\text{Pore diam., A.} = \frac{\text{pore volume (cc./g.)} \times 4 \times 10^4}{\text{surface area (M}^2\text{./g.)}}$$

[2] ASTM D-1238 Condition E.

Examination of the preceding table shows that varying the average pore diameter of the silica support from about 60 to about 350 A. results in increasing the melt indices of the resulting polymers from about 0.3 to about 2.7 whereas pore diameters of 60 A. or less appear equivalent in this respect.

While chromium oxide on a silica supported catalyst has been used for purpose of illustration, it is within the scope of this invention that either the catalytic component or the support or both may be different.

Reasonable variations and modifications of this invention can be made, or followed, without departing from the spirit or scope thereof.

We claim:

1. A process for obtaining a polymer of regulated melt index obtained by polymerizing a 1-olefin in a reaction zone in the presence of a supported polymerization catalyst comprising an oxide of a metal selected from the group consisting of chromium at least a portion of which is hexavalent, nickel, vanadium, and molybdenum and as a support at least one oxide selected from the group consisting of silica, alumina, zirconia and thoria, which comprises measuring the melt index of the polymer produced and increasing the average pore diameter if the melt index decreases and conversely decreasing the average pore diameter if the melt index increases, and thereby obtaining a polymer of said 1-olefin having a regulated melt index.

2. The process of claim 1 wherein the polymerization catalyst is chromium oxide supported on a silica base.

3. The process of claim 1 wherein the average pore diameter is selected from the range of about 60 to 400 Angstrom units.

4. The method of claim 1 wherein said 1-olefin is ethylene.

5. A process for obtaining a polymer of regulated melt index obtained by polymerizing a 1-olefin in a reaction zone in the presence of a supported polymerization catalyst comprising an oxide of a metal selected from the group consisting of chromium at least a portion of which is hexavalent, nickel, vanadium, and molybdenum and as a support at least one oxide selected from the group consisting of silica, alumina, zirconia and thoria, which comprises measuring the melt index of the polymer produced and increasing the average pore diameter if the melt index decreases and conversely decreasing the average pore diameter if the melt index increases by introducing a first supported polymerization catalyst into said reaction zone, introducing at least a second supported catalyst into said reaction zone, the support of said second catalyst having a different pore diameter than the support of said first catalyst, varying the proportions of said first and second catalysts so as to provide a polymerization catalyst to the system having an average pore diameter of at least 60 Angstrom units during the polymerization and thereby achieving a polymer of said 1-olefin having a regulated melt index.

6. In a process for polymerizing a 1-olefin in the presence of a polymerization catalyst comprising an oxide of a metal selected from the group consisting of chromium, at least a portion of which is hexavalent, nickel, vanadium, and molybdenum and as a support at least one oxide selected from the group consisting of silica, alumina, zirconia and thoria, the improvement which comprises measuring the melt index of the polymer produced and increasing the average pore diameter if the melt index decreases and conversely decreasing the average pore diameter if the melt index increases.

References Cited by the Examiner

UNITED STATES PATENTS 2,825,721  3/1958  Hogan et al. _____ 260—94.9
3,050,514  8/1962  Cawthon et al. _____ 260—94.9

JOSEPH L. SCHOFER, *Primary Examiner.*